United States Patent
Yang

(10) Patent No.: US 7,239,893 B2
(45) Date of Patent: Jul. 3, 2007

(54) APPARATUS AND METHOD FOR FORMING DOWNLINK BEAM IN A SMART ANTENNA SYSTEM

(75) Inventor: Jang-Hoon Yang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 409 days.

(21) Appl. No.: 10/984,888

(22) Filed: Nov. 10, 2004

(65) Prior Publication Data

US 2005/0101354 A1 May 12, 2005

(30) Foreign Application Priority Data

Nov. 10, 2003 (KR) .................... 10-2003-0079186

(51) Int. Cl.
*H04B 1/38* (2006.01)
(52) U.S. Cl. ................. 455/561; 455/562.1; 455/277.1
(58) Field of Classification Search ................ 455/561, 455/562.1, 560, 277.1, 517, 63.4; 343/383; 375/343
See application file for complete search history.

(56) References Cited

U.S. PATENT DOCUMENTS

| | | | |
|---|---|---|---|
| 6,064,338 A * | 5/2000 | Kobayakawa et al. ...... 342/383 |
| 6,292,135 B1 * | 9/2001 | Takatori et al. ............. 342/383 |
| 6,647,276 B1 * | 11/2003 | Kuwahara et al. ........ 455/562.1 |
| 6,697,633 B1 * | 2/2004 | Dogan et al. ................ 455/450 |
| 7,013,165 B2 * | 3/2006 | Yoon et al. .................. 455/561 |
| 7,054,664 B2 * | 5/2006 | Nagaraj .................... 455/562.1 |
| 7,117,016 B2 * | 10/2006 | Kisigami et al. ......... 455/562.1 |
| 2003/0087673 A1 * | 5/2003 | Walton et al. ............... 455/561 |
| 2004/0018818 A1 * | 1/2004 | Hottinen et al. .......... 455/562.1 |
| 2005/0020313 A1 * | 1/2005 | Chae et al. .................. 455/560 |
| 2005/0101353 A1 * | 5/2005 | Zeira et al. .............. 455/562.1 |
| 2005/0117675 A1 * | 6/2005 | Das et al. .................... 375/343 |

\* cited by examiner

*Primary Examiner*—Lana N. Le
(74) *Attorney, Agent, or Firm*—Roylance, Abrams, Berdo & Goodman, LLP

(57) ABSTRACT

Disclosed is an apparatus for forming a downlink traffic beam in a base station that separately forms a traffic beam for each user using multiple antennas. In the apparatus, an instantaneous direction estimator detects a signal having maximum energy and an energy value from a received uplink signal. A downlink spatial correlation matrix update unit calculates a downlink spatial correlation matrix using an output value of the instantaneous direction estimator and a downlink antenna direction response characteristic. A beam vector adaptation unit outputs a downlink bean-forming vector by reflecting a phase difference between a common beam and a traffic beam from an output of the downlink spatial correlation matrix update unit.

8 Claims, 4 Drawing Sheets

APPARATUS AND METHOD FOR FORMING DOWNLINK BEAM IN A SMART ANTENNA SYSTEM

PRIORITY

This application claims the benefit under 35 U.S.C. §119 (a) of an application entitled "Apparatus and Method for Forming Downlink Beam in a Smart Antenna System" filed in the Korean Intellectual Property Office on Nov. 10, 2003 and assigned Serial No. 2003-79186, the entire contents of which are incorporated herein by reference.

BACKGROUND OF THE INVENTION

1. Field of the Invention

The present invention relates generally to an apparatus and method for forming downlink beams in a wireless communication system. More particularly, the present invention relates to an apparatus and method for forming downlink beams in a smart antenna system.

2. Description of the Related Art

A Code Division Multiple Access (CDMA) mobile communication system is a typical example of a wireless communication system. Currently, the CDMA mobile communication system introduces a start antenna system for efficient communication. The term "smart antenna system" refers to a system, which forms downlink beams in a direction where a mobile station is located, using a plurality of array antennas, and applies weights to the signals received from the mobile station through a plurality of antennas, thereby receiving excellent signals. Forming downlink beams to a particular mobile station in this way reduces interference to other mobile stations, thereby contributing to an increase in the overall performance of the wireless communication system.

A description will now be made of a method for forming downlink beams in the well-known smart antenna system. In the smart antenna system, a method for forming downlink beams can be roughly divided into two methods. A first method stores beam-forming data having a small number of narrow beam widths in a table in association with location data of mobile stations. The smart antenna system detects the location of a mobile station and selects from the table a downlink beam matched to the location data for a location that is closest to the detected location of the mobile station, and forms a downlink beam using the selected beam. This method is called a "beam switching method." A second method stores in a table beam-forming data of each direction, having a plurality of beam widths for a particular direction. The smart antenna system matches received uplink information to downlink information, finds the most appropriate direction, selects a downlink beam for the most appropriate direction, and forms a downlink beam using the selected beam. In this case, downlink beam-forming information having the most appropriate beam width is selected by considering the distance between a base station and a mobile station.

The two methods are similar to each other in that they estimate a location of a user using uplink information. However, they are different from each other in that the first method is a collective downlink beam-forming method for defining a particular area and forming the same downlink beams for a plurality of users located in the particular area, and the second method is an individual downlink beam-forming method for forming different downlink beams for respective mobile stations according to the locations of the mobile stations.

FIG. 1 is a block diagram illustrating a conventional downlink beam-forming apparatus in a smart antenna system. Referring to FIG. 1, the downlink beam-forming apparatus is comprised of a plurality of array antennas ANTs, an instantaneous direction estimator 110, an average direction detector 120, a real-time beam width controller 130, and a transmission processor 140. The instantaneous direction estimator 110 is comprised of a front-end processor 111, a spatial correlator 112, an array manifold table (or uplink response characteristic table) 113, and a maximum energy detector 114.

An operation of the downlink beam-forming apparatus will be described herein below. Signals received via a plurality of the array antennas ANTs are input to the instantaneous direction estimator 110. The instantaneous direction estimator 110 detects a direction of instantaneous maximum energy of the received uplink signals. An operation of the instantaneous direction estimator 110 will now be described in detail herein below. In the instantaneous direction estimator 110, the front-end processor 111 converts the signals received from the array antennas ANTs such that the received signals can be processed by the spatial correlator 112. For example, in the CDMA2000 1× standard, the front-end processor 111 performs a unique code despreading and accumulation process. The signals processed by the front-end processor 111 are input to the spatial correlator 112. The spatial correlator 112 calculates correlations between array manifold data previously stored in the array manifold table 113 and the outputs of the front-end processor 111. The maximum energy detector 114 detects an index having the highest correlation and its energy, and outputs a maximum index value and a maximum energy value.

Outputs of the instantaneous direction estimator 110 are input to the average direction detector 120. The average direction detector 120 can calculate an average direction of the received signals using the outputs of the instantaneous direction estimator 110. A value of the average direction calculated by the average direction detector 120 is input to the real-time beam width controller 130. The real-time beam width controller 130 calculates a downlink beam width by calculating a distance between a base station and a mobile station based on the strengths of the received signals. That is, the real-time beam width controller 130 determines an appropriate downlink beam width using a variety of available information, such as information on the received uplink signals, transmission power of mobile stations, the strengths of signals received from the mobile stations, and the power control commands received from the mobile stations. The beam width is determined in the following method. To determine the beam width, the real-time beam width controller 130 first selects the available information. The real-time beam width controller 130 prepares a table for matching values of the available information to predetermined beam widths. The real-time beam width controller 130 receives the available information, finds from the table a value, which is matched to or most similar to the received information, and determines a beam width using the found value. After determining the beam width and the beam direction in this manner, the real-time beam width controller 130 outputs the determination result as a downlink beam vector. That is, the real-time beam width controller 130 outputs a downlink beam vector value to be actually transmitted. Downlink beam vector values output from the real-time beam width controller 130 are input to the transmission processor 140. The transmission processor 140 multiplies downlink transmission signals by the downlink beam vectors, and outputs the resultant signals to the corresponding array antennas ANTs.

Summarizing the operation of the smart antenna, in the process of determining a downlink traffic beam, the smart antenna determines a beam width using a detected transmission direction and the available information. Detecting the transmission direction and determining the beam width are achieved by selecting a beam from the previously stored table.

However, the method of selecting one of previously stored values for forming beams has the following three problems.

First, the number of beams is limited because the number of beams increases depending on the beam angle and the resolution of the beam width. That is, although an increase in number of beams enables the use of more accurate beams, the number of beams is limited due to the complexity of the algorithm for selecting the beams. Therefore, this method suffers performance deterioration as compared with the system capable of using infinite beams.

Second, this method has a characteristic dependent upon an assumption of distribution for an incident angle of a beam during beam generation. That is, in order to store a transmission beam, it is necessary to previously generate the transmission beam based on a particular criterion. In this way, this method previously assumes spatial distribution of received signals before generating the transmission beam. Therefore, although the direction of a signal received in an actual wireless communication environment is normally estimated, when spatial distribution of an actually received signal is different from the assumed distribution, performance is deteriorated. Such a phenomenon can frequently happen when signals are received via multiple paths at the same time. That is, this method is disadvantageous in that it is difficult to form correct transmission beams for the signals received via multiple paths.

Third, because a time delay occurs in adjusting a beam width, this method has performance deterioration in frequently varying environments. Because the method for forming downlink beams using the existing table adjusts a beam width depending upon downlink transmission power or error information transmitted over an uplink channel, the method cannot quickly adjust the beam width due to environmental changes. Therefore, a length of the section that should be observed to obtain meaningful statistics by this method must be increased. If a length of the statistic section increases in this way, there is a possible case where this method fails to generate an appropriate beam width for a user moving at a high speed.

Accordingly, there is a need for a system for forming downlink beams quickly and efficiently with respect to changing environmental conditions.

SUMMARY OF THE INVENTION

It is, therefore, an object of the present invention to provide an apparatus and method for forming correct downlink transmission beams on a real-time basis.

It is another object of the present invention to provide an apparatus and method for forming correct downlink transmission beams without using a previously stored table.

It is further another object of the present invention to provide a downlink transmission beam forming apparatus and method for reducing an error caused by the velocity of a moving mobile station.

To achieve the above and other objects, there is provided an apparatus for forming a downlink traffic beam in a base station that separately forms a traffic beam for each user using multiple antennas. The apparatus comprises an instantaneous direction estimator for detecting a signal having a maximum energy and an energy value from a received uplink signal; a downlink spatial correlation matrix update unit for calculating a downlink spatial correlation matrix using an output value of the instantaneous direction estimator and a downlink antenna direction response characteristic; and a beam vector adaptation unit for outputting a downlink beam-forming vector by reflecting a phase difference between a common beam and a traffic beam from the output of the downlink spatial correlation matrix update unit.

To achieve the above and other objects, there is provided a method for forming a downlink traffic beam in a base station that separately forms a traffic beam for each user using multiple antennas. The method comprises the steps of detecting a signal having a maximum energy and an energy value from a received uplink signal; calculating a downlink spatial correlation matrix using the detection result and a downlink antenna direction response characteristic; and outputting a downlink bean-forming vector by reflecting a phase difference between a common beam and a traffic beam from the calculated downlink spatial correlation matrix.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Figure 1:
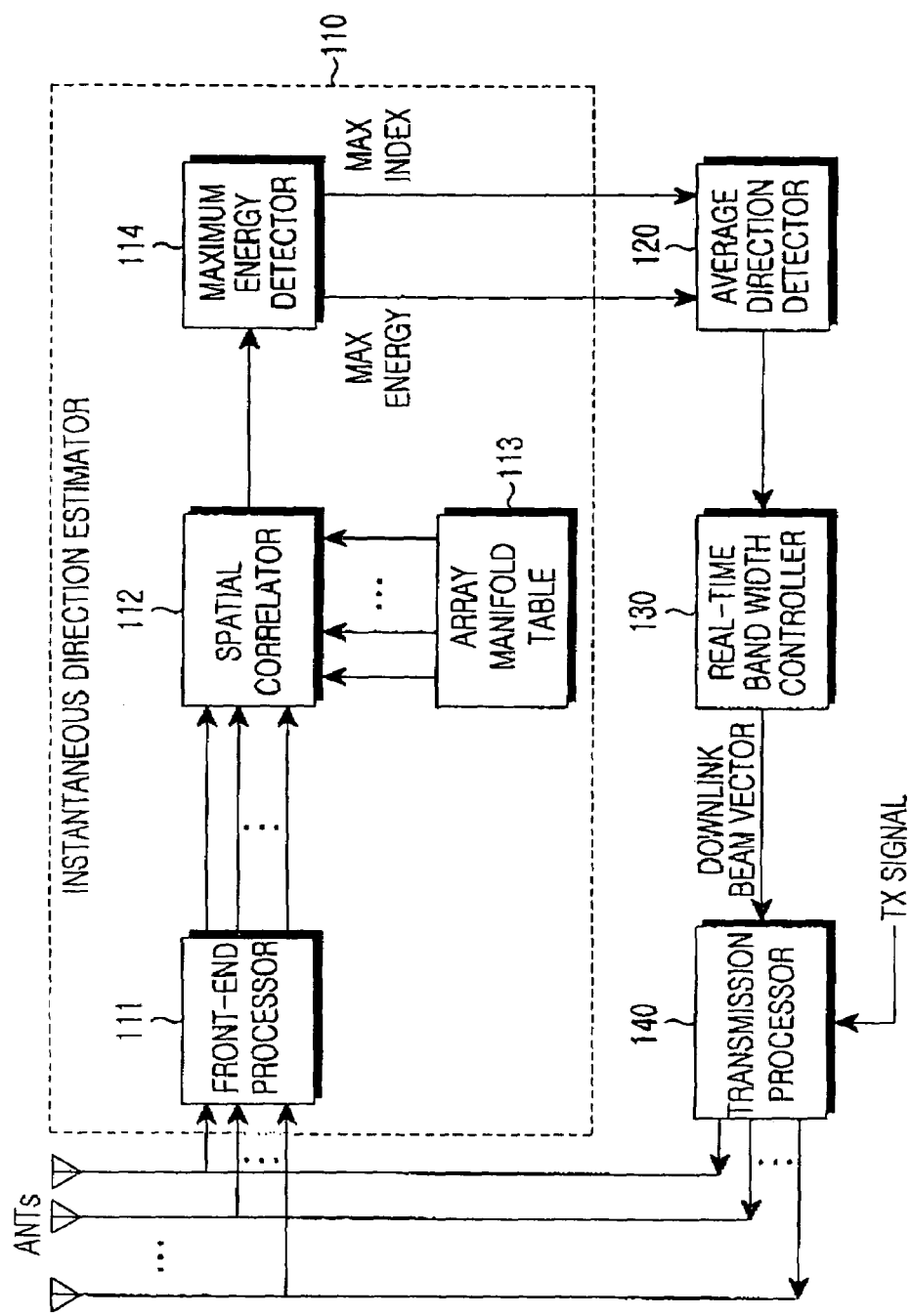
FIG. 1 is a block diagram illustrating a conventional downlink beam-forming apparatus in a smart antenna system.

An exemplary embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

In the following description, embodiments of the present invention provide an apparatus and method for transmitting radio signals in a communication system using multiple antennas (or a smart antenna). The multiple antennas described below can be applied to all base station transceiver systems (BTSs) that form beams. Although embodiments of the present invention will be described with reference to a frequency division transmission/reception method that uses different transmission/reception frequencies, it can also be applied to a mobile communication system using a time division transmission/reception method.

Figure 2:
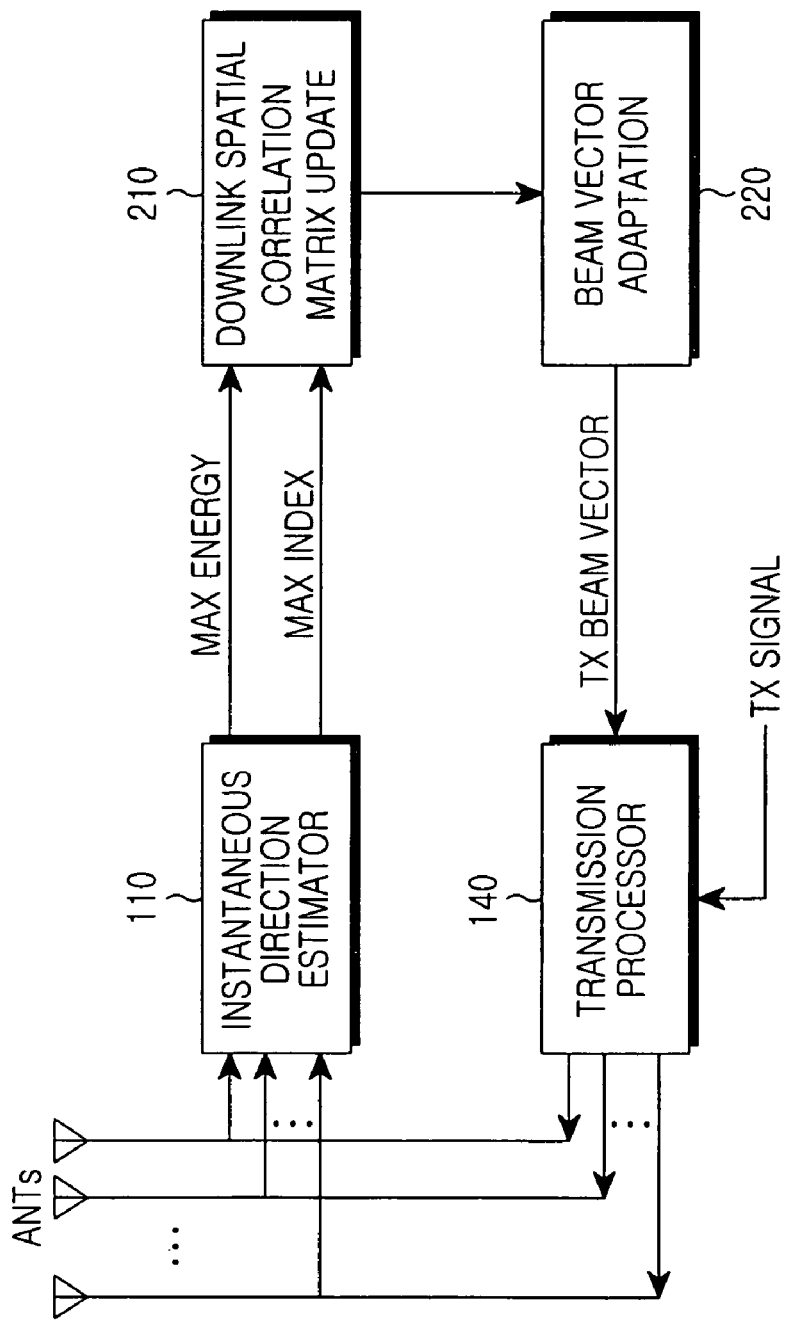
FIG. 2 is a block diagram illustrating a smart antenna system according to an embodiment of the present invention.

FIG. 2 is a block diagram illustrating a smart antenna system according to an embodiment of the present invention. With reference to FIG. 2, a detailed description will be made of a structure and operation of the smart antenna system according to an embodiment of the present invention.

Referring to FIG. 2, the smart antenna system is comprised of an instantaneous direction estimator 110, a downlink spatial correlation matrix update unit 210, a beam vector adaptation unit 220, and a transmission processor 140. A description will now be made of the general operation of the smart antenna system illustrated in FIG. 2.

The instantaneous direction estimator 110 is identical in structure and operation to the instantaneous direction estimator 110 illustrated in FIG. 1. Thus, the instantaneous direction estimator 110 pre-processes signals received from a plurality of antennas ANTs, calculates the correlation between the pre-processed received signals and antenna direction vectors previously stored in a table, and calculates a maximum energy and direction of the received signals using the calculated correlations. The downlink spatial correlation matrix update unit 210 updates downlink spatial correlations using input signals. An operation of updating the downlink correlations will be described below with reference to formulas. The updated downlink correlations are input to the beam vector adaptation unit 220. The beam vector adaptation unit 220 adaptively generates downlink beam vectors such that downlink beams are formed from downlink correlation matrices.

With reference to the formulas, a detailed description will now be made of the operations of the downlink spatial correlation matrix update unit 210 and the beam vector adaptation unit 220 in FIG. 2 according to an embodiment of the present invention. If uplink pilot signals received from a plurality of array antennas ANTs are defined as 'x', signals scattered in the air can be expressed as $$x = \Sigma a_l v(l) \qquad \text{Equation (1)}$$

In Equation (1), $a_l$ denotes a complex random variable representing magnitude and phase in a direction l, and v(l) denotes an antenna direction vector AMV representing an antenna characteristic in a direction l. The antenna direction vector AMV has a different value according to the shape and the material of the antenna. An average difference between a signal formed with a traffic beam and a signal formed with a common beam or a pilot beam in the scattering space of Equation (1) can be calculated by Equation (2). That is, Equation (2) calculates a value for minimizing a phase difference between a downlink pilot beam and a downlink traffic beam.

$$E\{|w_t^H x - w_p^H x|^2\} = (w_t - w_p)^H R (w_t - w_p) \qquad \text{Equation (2)}$$

In Equation (2), $w_t$ denotes beam-forming reception vectors of multiple array antennas, and t means traffic beams. In addition, $w_p$ denotes beam-forming reception vectors of multiple array antennas, and p means common beams. Further, R denotes a coefficient of a scattered signal. Therefore, Equation (2) represents a correlation between the respective beams. That is, a value of Equation (2) represents a level of the difference in the case where beams are formed such that the traffic beam is matched to the common beam in terms of effective radiated power (ERP) and phase. Therefore, a target function C can be expressed as Equation (3) using the relation of Equation (2).

$$C = w_t^H w_t + \lambda (w_t - w_p)^H R (w_t - w_p) \qquad \text{Equation (3)}$$

In Equation (3), a value of $w_t^H w_t$ means the gain of the beam. An optimal solution can be calculated by taking a variation in the target function C of Equation (3), and this can be calculated by taking a gradient in Equation (3). A traffic beam $w_t$ obtained by calculating a gradient in Equation (3) can be expressed as Equation (4), and a condition of Equation (4) should be satisfied.

$$w_t + \lambda R(w_t - w_p) = 0 \Rightarrow w_t = (I + \lambda R)^{-1} \lambda R w_p \qquad \text{Equation (4)}$$

A solution of Equation (4) is not expressed with a formula. Therefore, the smart antenna system of FIG. 2 adaptively forms a downlink beam by measuring and applying a phase difference in every adaptation process. Here, the level of the phase difference is the level of the normalized phase difference, and can be expressed as $$\mu = \frac{(w_t - w_p)^H R (w_t - w_p)}{w_p^H R w_p} \qquad \text{Equation (5)}$$

In Equation (5), μ denotes the level of the phase difference normalized with power of a downlink pilot. That is, a value of Equation (5) becomes a criterion for determining how a spatial area where the common beam exists is identical to a spatial area where the traffic beam exists. A real-time adaptation rule using gradient calculation to form a downlink beam on a real-time basis can be defined as $$w_t(n+1) = w_t(n) - \beta(w_t(n) + \lambda R(w_t(n) - w_p)) \qquad \text{Equation (6)}$$

In Equation (6), β denotes a parameter for adjusting a convergence speed of an adaptation algorithm, and λ denotes a weight of a condition for a level of the phase difference. The embodiments of the present invention propose a detailed method for adaptively using Equation (6), and a description thereof will be made herein below.

Equation (6) represents an operation performed in the beam vector adaptation unit 220 according to an embodiment of the present invention. In order to perform the operation of Equation (6), the beam vector adaptation unit 220 requires two values: one is a spatial correlation and another is a weight for a phase difference level.

A description will first be made of a method for calculating a spatial correlation. Generally, a CDMA mobile communication system has a band where there is no relation between a transmission frequency and a reception frequency. In such a mobile communication system, if a spatial correlation is calculated using an output of an uplink signal received from each antenna, an antenna direction response characteristic in a reception direction is different from an antenna direction response characteristic in a transmission direction. Therefore, if a correlation between a distortion occurring in a received uplink signal and noise included in the received uplink signal is applied to a downlink, there is a difference between a downlink transmission path and an uplink transmission path, causing a distortion of a traffic beam. Therefore, it is necessary to effectively remove the distortion of a traffic beam.

In order to generate a beam-forming vector matched to a downlink signal from a received uplink signal, embodiments of the present invention define a spatial correlation with a new method. A basic idea used for this method can represent a spatial correlation matrix with a level of average energy and a downlink antenna direction characteristic for each direction. This will be described below with reference to the formulas. When signals received from multiple antennas have L different time-of-arrivals (TOAs), a spatial correlation matrix should be updated each time using Equation (7).

$$R=(1-t_c)*R+t_c\alpha(m_l)v(m_l)v(m_l)^H \text{ for } l=1,2,\ldots,\ldots,L \quad \text{Equation (7)}$$

In Equation (7), $t_c$ denotes a time constant in a period for which an average is taken, and v(m) denotes a downlink antenna direction response characteristic in an $m^{th}$ direction. The downlink antenna direction response characteristic is a previously calculated or measured value. In addition, α(m) denotes a level of energy in a corresponding direction, which denotes an instantaneous downlink energy value. As a result, a matrix updated in this manner represents a downlink spatial correlation matrix. An one-to-one relationship is not satisfied between a normalized phase difference and a condition weight. This relationship is dependent upon a spatial channel characteristic. Therefore, in order to match an appropriate phase difference level, the embodiments of the present invention use an adaptation rule represented by, $$w_t(n+1) = w_t(n) - \beta(w_t(n) + \lambda(n)R(w_t(n) - w_p)) \quad \text{Equation (8)}$$

$$\lambda(n+1) = \frac{\mu(n+1)}{\mu_t}\lambda(n),$$

$$\mu(n+1) = \frac{(w_t(n+1) - w_p)^H R(w_t(n+1) - w_p)}{w_p^H R w_p}.$$

where $w_t$ denotes a beam-forming reception vector for a traffic beam, $w_p$ denotes a beam-forming reception vector for a common beam, λ denotes a weight of a condition for a phase difference level, β denotes a parameter for adjusting a convergence speed of an adaptation algorithm, and μ denotes a normalized phase difference level. In Equation (8), the basic idea of the adaptation rule is to measure the normalized phase difference level each time, and applies a higher weight to the condition when the phase difference level is higher than a target phase difference, and applies a lower weight when the phase difference level is lower than the target phase difference.

Figure 3:
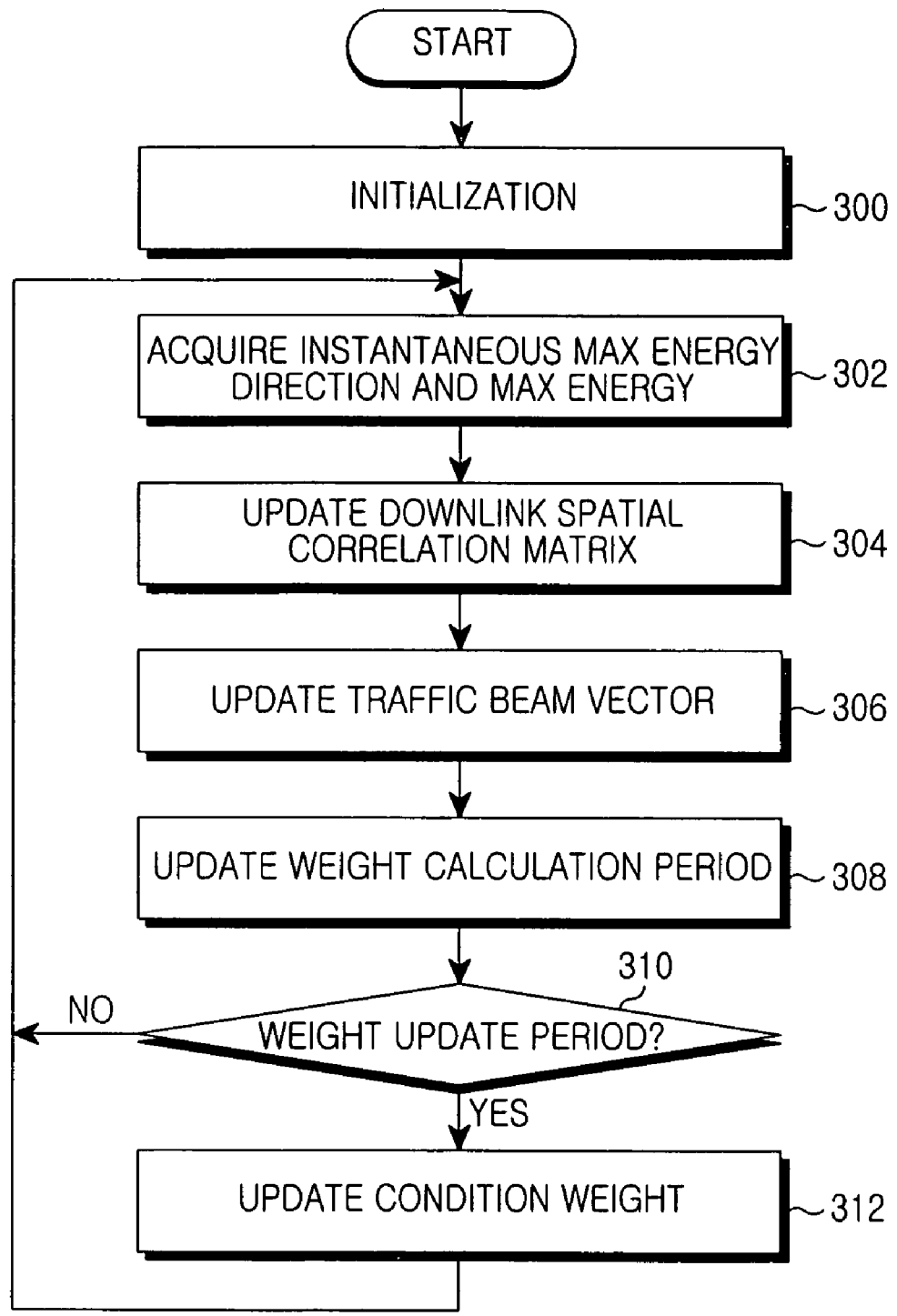
FIG. 3 is a flowchart illustrating a process of calculating and updating a downlink beam-forming vector in a smart antenna system according to an embodiment of the present invention.
Figures 4A, 4C:
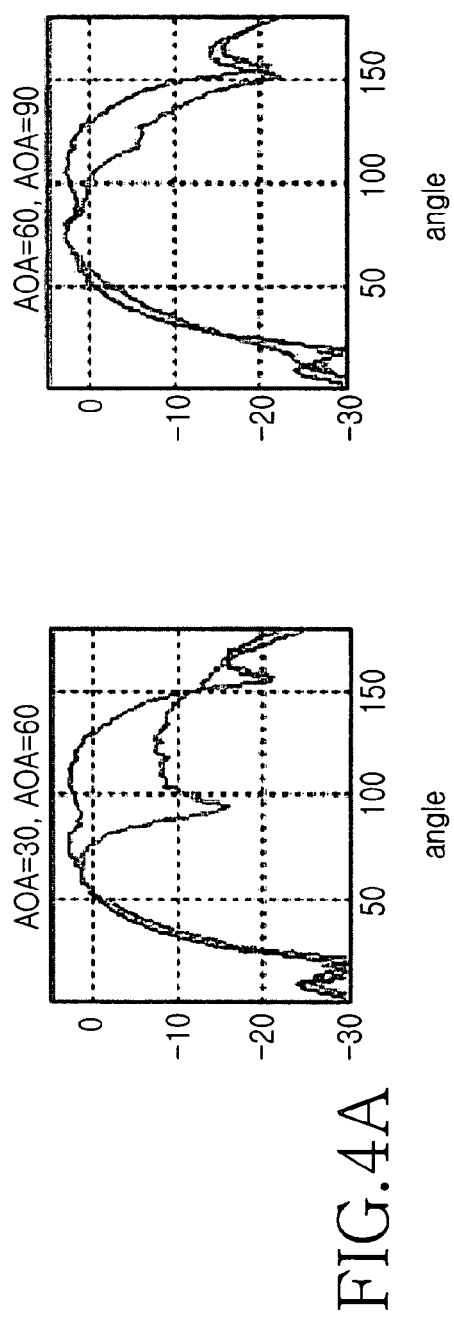
FIGS. 4A to 4D are exemplary simulation graphs illustrating a comparison between a traffic beam pattern and a common beam pattern in the smart antenna system according to an embodiment of the present invention.
Figures 4B, 4D:
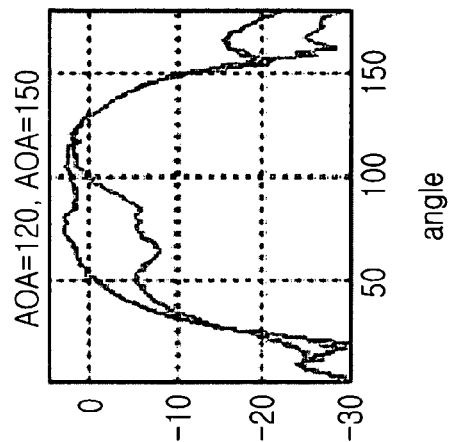

FIG. 3 is a flowchart illustrating a process of calculating and updating a downlink beam-forming vector in a smart antenna system according to an embodiment of the present invention. Referring to FIG. 3, in step 300, the smart antenna system, which is a downlink beam forming apparatus, performs an initialization process. In the initialization process, the smart antenna system resets a correlation matrix R to '0', resets a vector value of traffic beams received from array antennas, sets a condition weight for a phase difference level to '1', and sets a parameter value for adjusting a convergence speed of an adaptation algorithm to its initial value. For example, the initial value of the parameter for adjusting a convergence speed of the adaptation algorithm can be 0.001. In addition, the smart antenna system resets counter values for weight updating, in the initialization process.

After the initialization process of step 300, the instantaneous direction estimator 110 in the smart antenna system according to embodiments of the present invention proceeds to step 302 where it acquires an instantaneous maximum energy direction and a maximum energy value in the direction. A process for acquiring the instantaneous maximum energy direction and the maximum energy value is performed in the method described in the Related Art section and also described in connection with FIG. 2. Thereafter, in step 304, the downlink spatial correlation matrix update unit 210 updates a downlink spatial correlation matrix in the method defined by Equation (7). The updated downlink spatial correlation matrix value is input to the beam vector adaptation unit 220. In step 306, the beam vector adaptation unit 220 updates a downlink beam vector in the method defined by Equation (6) to update the traffic beam vector. The updated downlink beam vector means a vector value of the traffic beam, and is updated using the currently updated downlink spatial correlation matrix and a previous traffic beam vector. The traffic beam vector updated by the downlink beam vector adaptation unit 220 is input to the transmission processor 140, and the transmission processor 140 multiplies the updated traffic beam vector by a transmission signal, thereby forming a downlink beam through a corresponding antenna.

After step 306, the smart antenna system proceeds to step 308 where it updates a weight calculation period. The update of the weight calculation period is achieved by preferably performing a modulo operation with a predetermined frequency limit. Before performing the frequency limit-modulo operation, the smart antenna system increases a counter value for updating the weight initialized in the initialization process of step 300, by 1. The weight calculation period is preferably updated by performing a modulo operation on the counter value using a predetermined frequency limit. In step 310, the smart antenna system determines whether a counter value for which the weight calculation period is updated indicates a weight update period. In this embodiment, the weight update period arrives each time a counter value is reset to '0' by the modulo operation.

The reason for calculating the weight update period in the manner of steps 308 and 310 is to previously set a condition weight in order to reduce algorithm complexity, and determine whether this period has arrived. If it is determined in step 310 that a predetermined weight update period has arrived, the smart antenna system proceeds to step 312 where it updates the condition weight using a ratio of a currently normalized phase difference error to a target phase difference error. However, if it is determined that the predetermined weight update period has not arrived, the smart antenna system returns to step 302, and repeats the succeeding process. Also, after performing the weight update process of step 312, the smart antenna system repeatedly performs the process starting at step 302. The smart antenna system updates a beam vector value at periods set in the system through steps 302 to 312, and forms a beam most appropriate for the currently given downlink channel statistics.

FIGS. 4A to 4D are simulation graphs illustrating a comparison between a traffic beam pattern and a common beam pattern in the smart antenna system according to an embodiment of the present invention. In the case of FIGS. 4A to 4D, a channel used has 2 multipaths, the multipaths have a 30°-phase difference, and a signal spreading level in each path is 10. It can be understood from the simulation graphs of FIGS. 4A to 4D that no matter where the multipaths are located, the traffic beam has the same curve as that of the common beam in an area where an induced traffic beam signal exists. That is, it can be noted that a downlink beam is adaptively formed effectively.

As can be understood from the foregoing description, the smart antenna system according to an embodiment of the present invention can calculate the downlink beam most appropriate for current statistics on a real-time basis by inducing a downlink spatial correlation matrix using uplink channel information. Therefore, when there are multipaths during transmission and reception and a mobile station is moving at high speed, the smart antenna system can increase its downlink gain by using an appropriate beam. In this way, the smart antenna system can efficiently limit interference to another mobile station. In addition, when memory resource of the system is insufficient, the previously stored beam vector is not used, thereby saving the memory.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for forming a downlink traffic beam in a base station that separately forms a traffic beam for each user using multiple antennas, the apparatus comprising;
   an instantaneous direction estimator for detecting a signal having maximum energy and an energy value from a received uplink signal;
   a downlink spatial correlation matrix update unit for calculating a downlink spatial correlation matrix using an output value of the instantaneous direction estimator and a downlink antenna direction response characteristic; and
   a beam vector adaptation unit for outputting a downlink beam-forming vector by reflecting a phase difference between a common beam and a traffic beam from an output of the downlink spatial correlation matrix update unit.

2. The apparatus of claim 1, wherein the downlink spatial correlation matrix update unit calculates a downlink spatial correlation matrix using the following equation, $$R=(1-t_c)*R+t_c\alpha(m_l)v(m_l)v(m_l)^H \text{ for } l=1,2,\ldots,\ldots,L$$

where l denotes a coefficient of a scattered signal, $t_c$ denotes a time constant in a period for which an average is taken, v(m) denotes a downlink antenna direction response characteristic in an $m^{th}$ direction, and $\alpha$(m) denotes a level of energy in a corresponding direction.

3. The apparatus of claim 1, wherein the phase difference between a common beam and a traffic beam is updated such that it adaptively satisfies a target value determined in a system.

4. The apparatus of claim 1, wherein the phase difference between a common beam and a traffic beam is adaptively updated using the following equation, $$w_t(n+1) = w_t(n) - \beta(w_t(n) + \lambda(n)R(w_t(n) - w_p))$$

$$\lambda(n+1) = \frac{\mu(n+1)}{\mu_t}\lambda(n),$$

$$\mu(n+1) = \frac{(w_t(n+1) - w_p)^H R(w_t(n+1) - w_p)}{w_p^H R w_p}$$

where $w_t$ denotes a beam-forming reception vector for a traffic beam, $w_p$ denotes a beam-forming reception vector for a common beam, $\lambda$ denotes a weight of a condition for a phase difference level, $\beta$ denotes a parameter for adjusting a convergence speed of an adaptation algorithm, and $\mu$ denotes a normalized phase difference level.

5. A method for forming a downlink traffic beam in a base station that separately forms a traffic beam for each user using multiple antennas, the method comprising the steps of:
   detecting a signal having maximum energy and an energy value from a received uplink signal;
   calculating a downlink spatial correlation matrix using the detection result and a downlink antenna direction response characteristic; and
   outputting a downlink beam-forming vector by reflecting a phase difference between a common beam and a traffic beam from the calculated downlink spatial correlation matrix.

6. The method of claim 5, wherein the downlink spatial correlation matrix is calculated using the following equation, $$R=(1-t_c)*R+t_c\alpha(m_l)v(m_l)v(m_l)^H \text{ for } l=1,2,\ldots,\ldots,L$$

where l denotes a coefficient of a scattered signal, $t_c$ denotes a time constant in a period for which an average is taken, v(m) denotes a downlink antenna direction response characteristic in an $m^{th}$ direction, and $\alpha$(m) denotes a level of energy in a corresponding direction.

7. The method of claim 5, wherein the phase difference between a common beam and a traffic beam is updated such that it adaptively satisfies a target value determined in a system.

8. The method of claim 5, wherein the phase difference between a common beam and a traffic beam is adaptively updated using the following equation, $$w_t(n+1) = w_t(n) - \beta(w_t(n) + \lambda(n)R(w_t(n) - w_p))$$

$$\lambda(n+1) = \frac{\mu(n+1)}{\mu_t}\lambda(n),$$

$$\mu(n+1) = \frac{(w_t(n+1) - w_p)^H R(w_t(n+1) - w_p)}{w_p^H R w_p}$$

where $w_t$ denotes a beam-forming reception vector for a traffic beam, $w_p$ denotes a beam-forming reception vector for a common beam, $\lambda$ denotes a weight of a condition for a phase difference level, $\beta$ denotes a parameter for adjusting a convergence speed of an adaptation algorithm, and $\mu$ denotes a normalized phase difference level.

* * * * *